United States Patent
Nishioka

(10) Patent No.: US 12,049,243 B2
(45) Date of Patent: Jul. 30, 2024

(54) EMERGENCY EVACUATION DEVICE, SERVER DEVICE, AND EMERGENCY EVACUATION METHOD

(71) Applicant: Mitsubishi Electric Corporation, Tokyo (JP)

(72) Inventor: Tetsuro Nishioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 266 days.

(21) Appl. No.: 17/780,378

(22) PCT Filed: Jan. 27, 2020

(86) PCT No.: PCT/JP2020/002646
§ 371 (c)(1),
(2) Date: May 26, 2022

(87) PCT Pub. No.: WO2021/152645
PCT Pub. Date: Aug. 5, 2021

(65) Prior Publication Data
US 2022/0410940 A1     Dec. 29, 2022

(51) Int. Cl.
*B60W 60/00* (2020.01)
*B60W 30/06* (2006.01)
*G08G 1/14* (2006.01)

(52) U.S. Cl.
CPC ......... *B60W 60/0059* (2020.02); *B60W 30/06* (2013.01); *B60W 2420/403* (2013.01);
(Continued)

(58) Field of Classification Search
CPC ......... B60W 60/0059; B60W 2552/00; B60W 2556/45; B60W 30/06; B60W 2420/403; B60W 2540/26; G08G 1/14
See application file for complete search history.

(56) References Cited

U.S. PATENT DOCUMENTS

2016/0037198 A1   5/2016   Hauler et al.
2017/0151960 A1   6/2017   Fujiki et al.
(Continued)

FOREIGN PATENT DOCUMENTS

JP   2010-125923 A   6/2010
JP   2016-115023 A   6/2016
(Continued)

OTHER PUBLICATIONS

Communication dated Jan. 31, 2023, issued in Japanese Application No. 2021-573627.
(Continued)

*Primary Examiner* — Mathew Franklin Gordon
(74) *Attorney, Agent, or Firm* — Sughrue Mion, PLLC; Richard C. Turner

(57) ABSTRACT

A first blind spot information acquisition unit inputs road geometry information and traveling environment information which are acquired by an information acquisition unit to a first blind spot inference model, and thereby acquires, using the first blind spot inference model, first blind spot information indicating a blind spot area of a road along which a vehicle is traveling, the first blind spot inference model being configured to output first blind spot information indicating a blind spot area of a road when receiving road geometry information about geometry of the road and traveling environment information about a traveling environment of the road. A parking position determination unit determines a parking position of the vehicle by using the first blind spot information acquired by the first blind spot information acquisition unit.

11 Claims, 10 Drawing Sheets

(52) U.S. Cl.
CPC ..... *B60W 2540/26* (2013.01); *B60W 2552/00* (2020.02); *B60W 2556/45* (2020.02); *G08G 1/14* (2013.01)

(56) References Cited

U.S. PATENT DOCUMENTS

| | | |
|---|---|---|
| 2017/0305440 A1 | 10/2017 | Oba |
| 2019/0106122 A1 | 4/2019 | Oba |
| 2019/0367049 A1 | 12/2019 | Oba |
| 2020/0148228 A1 | 5/2020 | Oba |

FOREIGN PATENT DOCUMENTS

| | | | |
|---|---|---|---|
| JP | 2016-530596 | A | 9/2016 |
| JP | 2017-094992 | A | 6/2017 |
| JP | 2018-144720 | A | 9/2018 |
| JP | 2018-154329 | A | 10/2018 |
| JP | 2018-181120 | A | 11/2018 |

OTHER PUBLICATIONS

International Search Report for PCT/JP2020/002646 dated Mar. 24, 2020 [PCT/ISA/210].

EMERGENCY EVACUATION DEVICE, SERVER DEVICE, AND EMERGENCY EVACUATION METHOD

CROSS REFERENCE TO RELATED APPLICATIONS

This application is a National Stage of International Application No. PCT/JP2020/002646 filed Jan. 27, 2020.

TECHNICAL FIELD

The present disclosure relates to an emergency evacuation device, a server device, and an emergency evacuation method for vehicles.

BACKGROUND ART

An emergency evacuation device that, when an occupant sitting on the driver's seat of a vehicle having an autonomous driving function enters a manual driving incapable state in which the occupant cannot perform manual driving, because of a loss of consciousness, sudden illness or the like, determines a parking position such as a road shoulder, and causes the vehicle to evacuate to the parking position and to stop by using the autonomous driving function has been proposed (refer to, for example, Patent Literature 1).

CITATION LIST

Patent Literature

Patent Literature 1: JP 2010-125923 A

SUMMARY OF INVENTION

Technical Problem

When the parking position of the vehicle is a static blind spot such as a spot immediately behind a curve, or when the parking position of the vehicle is a dynamic blind spot such as a spot behind a parked vehicle, there is a possibility of inviting a second accident in which a following vehicle bumps into the rear of the vehicle which has performed an emergency stop at the parking position and a rescuer who is performing rescue operations around the vehicle.

As measures regarding static blind spots, in Patent Literature 1, a method of detecting static blind spots on the basis of the geometry of a road, and determining a parking position in such a way as to prevent the parking position from being in any static blind spot is used. However, in Patent Literature 1, measures regarding dynamic blind spots are not taken.

The present disclosure is made in order to solve the above-mentioned problem, and it is therefore an object of the present disclosure to provide a technique of determining a parking position while preventing the parking position from being in a static blind spot or a dynamic blind spot.

Solution to Problem

An emergency evacuation device according to the present disclosure mounted in a first vehicle determines a parking position to which the first vehicle in a traveling state is to be caused to evacuate, and includes: processing circuitry to acquire road geometry information about the geometry of the road along which the first vehicle is traveling, and traveling environment information about a traveling environment of the road; to input the road geometry information and the traveling environment information which are acquired to a first blind spot inference model, and thereby acquire, using the first blind spot inference model, first blind spot information indicating a blind spot area of the road along which the first vehicle is traveling, the first blind spot inference model being configured to output first blind spot information indicating a blind spot area of a road when receiving road geometry information about the geometry of the road and traveling environment information about a traveling environment of the road; and to determine the parking position by using the first blind spot information acquired.

Advantageous Effects of Invention

According to the present disclosure, because using the first blind spot inference model that, when receiving road geometry information related to a static blind spot and traveling environment information related to a dynamic blind spot, outputs first blind spot information indicating a blind spot area of a road, the first blind spot information indicating a blind spot area of the road along which the first vehicle is traveling is acquired to determine a parking position, a parking position can be determined while the parking position is prevented from being in a static blind spot or a dynamic blind spot.

DESCRIPTION OF EMBODIMENTS

Hereinafter, in order to explain the present disclosure in greater detail, embodiments of the present disclosure will be described with reference to the accompanying drawings.

Embodiment 1

Figure 1:
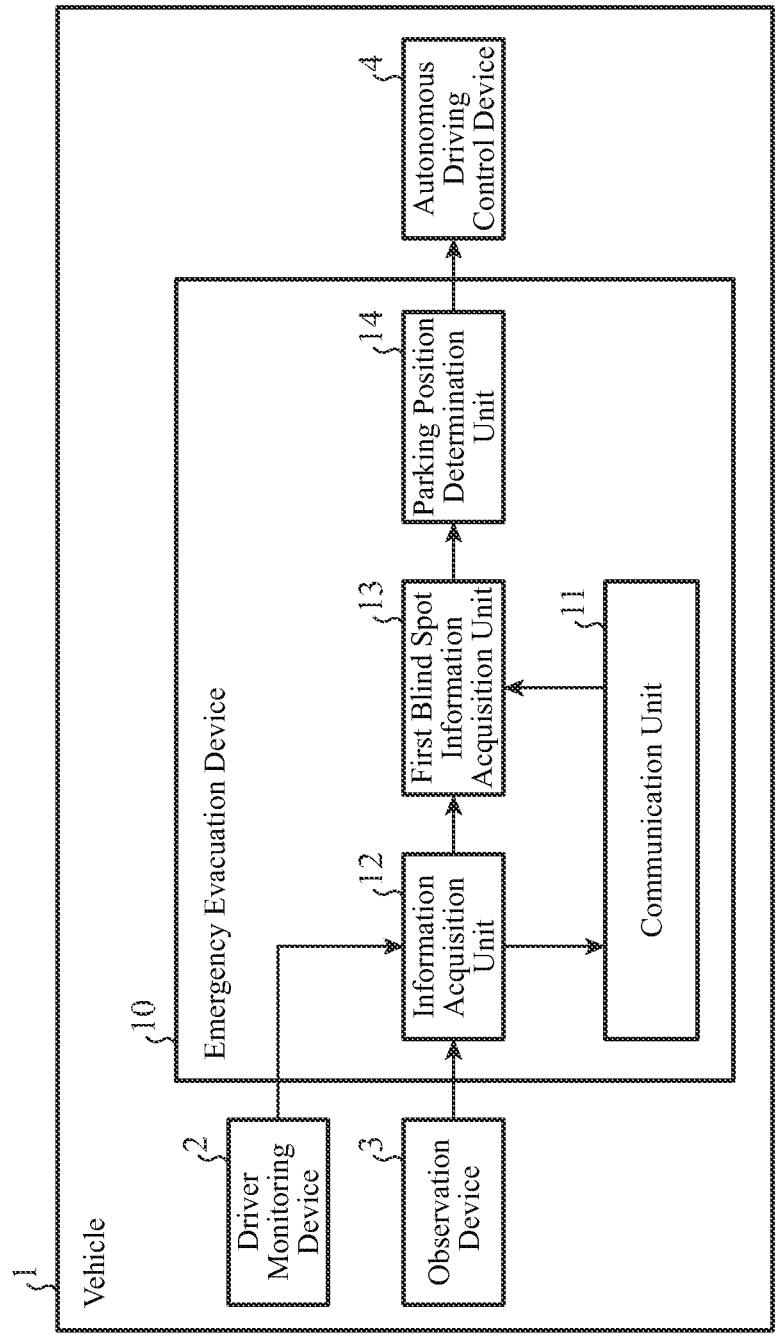
FIG. 1 is a block diagram showing an example of the configuration of an emergency evacuation device according to Embodiment 1.
Figure 2:
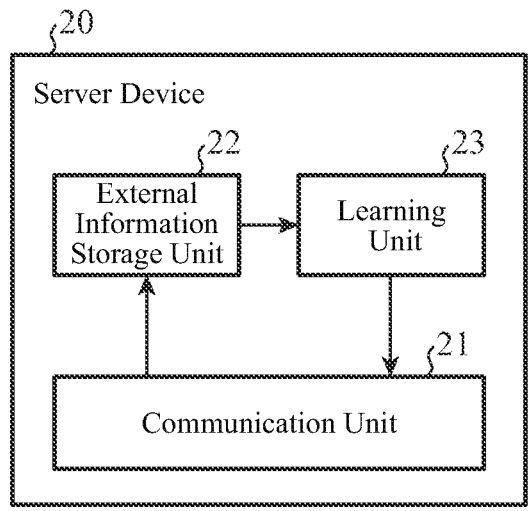
FIG. 2 is a block diagram showing an example of a server device according to Embodiment 1.

FIG. 1 is a block diagram showing an example of the configuration of an emergency evacuation device 10 according to Embodiment 1. FIG. 2 is a block diagram showing an example of the configuration of a server device 20 according to Embodiment 1. Autonomous driving technologies of causing a vehicle 1 to autonomously travel include a fully autonomous driving technology which does not need any driving operation performed by an occupant under any environment, and an autonomous driving technology which makes it possible to perform autonomous driving under a specific environment, but needs manual driving performed by an occupant depending on circumstances. For example, fully autonomous driving corresponds to the autonomous driving level 4 (advanced autonomous driving) and the autonomous driving level 5 (full autonomous driving), out of the autonomous driving levels 0 to 5 defined by the Society of Automotive Engineers (SAE), and autonomous driving which needs manual driving corresponds to the autonomous driving level 3 (conditional autonomous driving) or less, out of the autonomous driving levels 0 to 5.

Autonomous vehicles which have been in an advanced stage of development in recent years are based on the latter autonomous driving technology, and there are cases in which the autonomous vehicles switch from autonomous driving to manual driving at times of occurrence of disturbance, failure and so on. In those autonomous vehicles, an occupant sitting on the driver's seat (referred to as a "driver" hereinafter) needs to be in a state where the driver can perform manual driving, as a preparation particularly for urgent switching. If the driver is in a state where the driver cannot perform manual driving immediately after switching, autonomous vehicles have no choice but to stop.

As shown in FIG. 1, a driver monitoring device 2, an observation device 3, an autonomous driving control device 4 and the emergency evacuation device 10 are mounted in the vehicle 1. The driver monitoring device 2 observes the driver of the vehicle 1 by using a sensor such as an image capturing device or a living body sensor, and monitors the state of the occupant by using a result of the observation. When determining that the driver has entered a state in which the driver cannot perform manual driving because of a loss of consciousness, sudden illness or the like (referred to as the "manual driving incapable state" hereinafter), the driver monitoring device 2 provides a notification for the emergency evacuation device 10. The observation device 3 observes an area in the vicinity of the vehicle 1 by using at least one of an image capturing device or a distance sensor. The distance sensor is an ultrasonic sensor, a millimeter wave sensor, laser imaging detection and ranging (LIDAR), or the like.

The emergency evacuation device 10 includes a communication unit 11, an information acquisition unit 12, a first blind spot information acquisition unit 13 and a parking position determination unit 14. The communication unit 11 performs wireless communication with a communication unit 21 of the server device 20. When receiving a notification indicating that the driver of the vehicle 1 has entered the manual driving incapable state from the driver monitoring device 2, the information acquisition unit 12 acquires observation information generated by the observation device 3. The information acquisition unit 12 outputs the information acquired from the observation device 3 to the first blind spot information acquisition unit 13. The first blind spot information acquisition unit 13 has a first blind spot inference model. The first blind spot information acquisition unit 13 inputs the observation information generated by the observation device 3 to the first blind spot inference model, and thereby acquires first blind spot information which the first blind spot inference model outputs. The parking position determination unit 14 determines a parking position of the vehicle 1 by using the first blind spot information acquired by the first blind spot information acquisition unit 13. The parking position determination unit 14 notifies the autonomous driving control device 4 of the determined parking position. The autonomous driving control device 4 causes the vehicle 1 to evacuate to the parking position, and to stop, by controlling various actuators of the vehicle 1.

Here, the information inputted to the first blind spot inference model includes road geometry information about the geometry of the road along which the vehicle 1 is traveling, and traveling environment information about a traveling environment of the road.

The road geometry information indicates the geometry, such as the fact that the road is a straight line, a curve or a slope. The road geometry information may be either an image captured by the image capturing device which the observation device 3 has or map information which a not-illustrated map information storage unit stores. For example, in the case where the road is a curve, a blind spot where the vehicle 1 cannot be visually recognized by following vehicles occurs in the vicinity of the curve. Further, for example, in the case where the road is a slope, a blind spot where the vehicle 1 cannot be visually recognized by following vehicles occurs in the vicinity of the slope. Because the geometry of the road does not change over time, blind spots resulting from the geometry of the road also do not change over time. Therefore, it can be said that every blind spot which results from the geometry of the road is static.

The traveling environment information indicates an obstruction present on the road or in the vicinity of the road. The traveling environment information may be either an image captured by the image capturing device which the observation device 3 has or information about a distance measured by the distance sensor which the observation device 3 has. In the case where the obstruction is a movable body for example a vehicle, while this vehicle is parked, a blind spot where the vehicle 1 cannot be visually recognized by following vehicles occurs in the vicinity of the parked vehicle, but the blind spot is lost after the parked vehicle has moved. It can be said that every blind spot which results, in this way, from an obstruction present on the road or in the vicinity of the road is dynamic.

The first blind spot information which the first blind spot inference model outputs indicates a blind spot area of the road along which the vehicle 1 is traveling. This blind spot area may include a static blind spot area which results from the geometry of the road, and a dynamic blind spot area which results from an obstruction present on the road or in the vicinity of the road. For example, a case in which there is a parked vehicle on the road along which the vehicle 1 is traveling and ahead of the vehicle 1, and the road is curved ahead of the parked vehicle is considered. In this case, a dynamic blind spot area which results from the parked vehicle and a static blind spot area which results from the curve are included in the first blind spot information.

The first blind spot inference model originates from a second blind spot inference model generated by the server device 20. The server device 20 includes the communication unit 21, an external information storage unit 22 and a learning unit 23. The communication unit 21 receives the observation information generated by the vehicle 1 equipped with the emergency evacuation device 10, i.e., the road geometry information and the traveling environment information. For example, in FIG. 1, the communication unit 11 receives the observation information generated by the observation device 3 via the information acquisition unit 12, and transmits the information to the server device 20.

The external information storage unit 22 stores road geometry information and traveling environment information which are transmitted from each of the emergency evacuation devices 10 mounted in a large number of vehicles 1. The learning unit 23 performs machine learning which uses, as inputs, pieces of road geometry information and pieces of traveling environment information which are stored in the external information storage unit 22, and thereby generates the second blind spot inference model for inferring a static blind spot area which results from the geometry of the road, and a dynamic blind spot area which results from an obstruction present on the road or in the vicinity of the road. The learning unit 23 uses a deep neural network or the like as a machine learning method. The communication unit 21 transmits the second blind spot inference model generated by the learning unit 23 to the vehicle 1. When receiving the second blind spot inference model, the communication unit 11 of the vehicle 1 outputs this second blind spot inference model to the first blind spot information acquisition unit 13. The first blind spot information acquisition unit 13 uses the second blind spot inference model as the above-mentioned first blind spot inference model.

The learning unit 23 may generate either a single second blind spot inference model for inferring both a static blind spot area and a dynamic blind spot area, or two types of models: a second blind spot inference model for inferring a static blind spot area; and a second blind spot inference model for inferring a dynamic blind spot area. Further, when generating a second blind spot inference model for inferring a dynamic blind spot area, the learning unit 23 may perform learning while using an image acquired by capturing an obstruction from a forward or backward direction as training data, and using an image acquired by capturing the obstruction from a lateral direction as teacher data.

Figure 3:
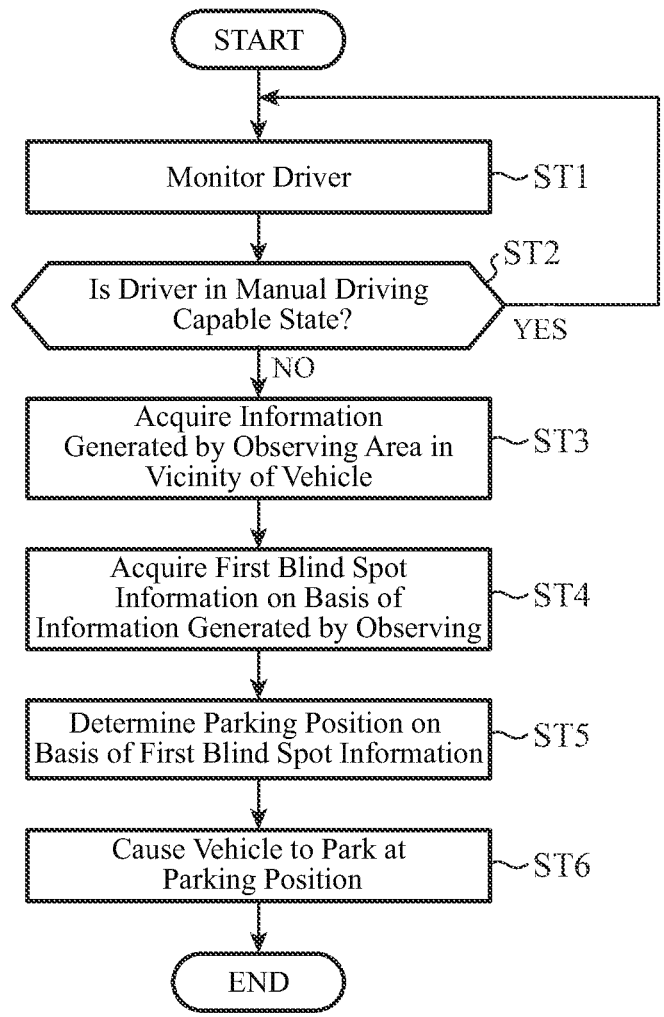
FIG. 3 is a flowchart showing an example of the operation of the emergency evacuation device according to Embodiment 1.

FIG. 3 is a flowchart showing an example of the operation of the emergency evacuation device 10 according to Embodiment 1. For example, when the ignition switch of a vehicle 1 is switched on, the emergency evacuation device 10 starts the operation shown in the flowchart of FIG. 3.

In step ST1, the driver monitoring device 2 monitors the driver. When the driver is in a manual driving capable state where the driver can perform manual driving (when "YES" in step ST2), the driver monitoring device 2 performs the process of step ST1. When the driver is in the manual driving incapable state (when "NO" in step ST2), the driver monitoring device 2 notifies the information acquisition unit 12 of the emergency evacuation device 10 that the driver has entered the manual driving incapable state.

In step ST3, the information acquisition unit 12 acquires the observation information which the observation device 3 has generated by observing an area in the vicinity of the vehicle 1, from the observation device 3. In step ST4, the first blind spot information acquisition unit 13 inputs the information which the information acquisition unit 12 has acquired from the observation device 3 to the first blind spot inference model, and, from this first blind spot inference model, acquires first blind spot information indicating a blind spot area of the road along which the vehicle 1 is traveling.

In step ST5, using the first blind spot information which the first blind spot information acquisition unit 13 has acquired from the first blind spot inference model, the parking position determination unit 14 determines a parking position by setting, as the parking position, a place (a road shoulder or the like) which is not the blind spot area of the road along which the vehicle 1 is traveling. For example, the parking position determination unit 14 detects areas of the road along which the vehicle 1 is traveling from an image captured by the image capturing device which the observation device 3 has, and sets, as the parking position, a place which is not the blind spot area, out of the detected areas of the road. As an alternative, for example, the parking position determination unit 14 may set, as the parking position, a place which is not the blind spot area of the road along which the vehicle 1 is traveling by using map information which a not-illustrated map information storage unit stores.

In step ST6, the autonomous driving control device 4 causes the vehicle 1 to evacuate to the parking position which the parking position determination unit 14 has determined, and to stop.

Figure 4:
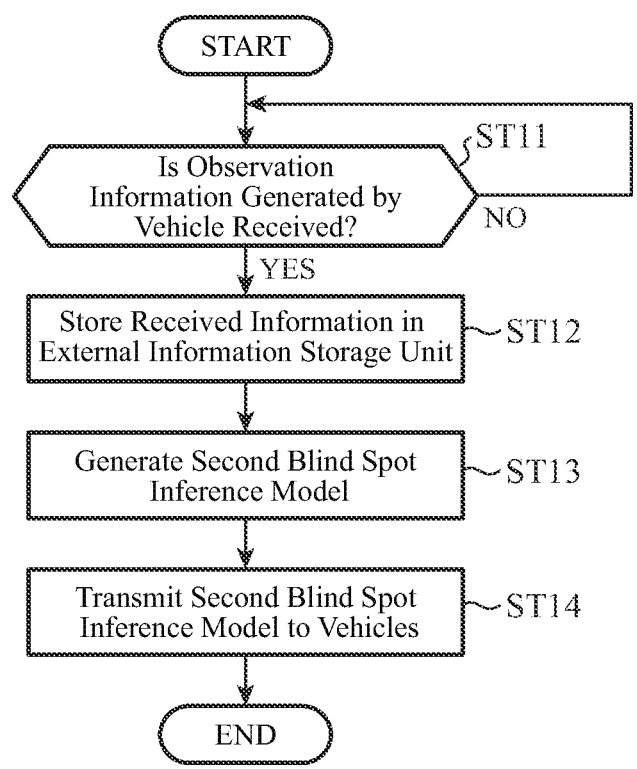
FIG. 4 is a flowchart showing an example of the operation of the server device according to Embodiment 1.

FIG. 4 is a flowchart showing an example of the operation of the server device 20 according to Embodiment 1.

In step ST11, when receiving observation information generated by the observation device 3 of the vehicle 1 equipped with the emergency evacuation device 10, from the vehicle 1 (when "YES" in step ST11), the communication unit 21 stores the received information in the external information storage unit 22 (step ST12). In contrast, when not receiving observation information generated by the vehicle 1 equipped with the emergency evacuation device 10, from the vehicle 1 (when "NO" in step ST11), the communication unit 21 repeats the receiving process.

In step ST13, when the amount of the pieces of information stored in the external information storage unit 22 reaches a predetermined amount, the learning unit 23 generates the second blind spot inference model by using the pieces of information stored in the external information storage unit 22. In step ST14, the communication unit 21 transmits the second blind spot inference model which the learning unit 23 has generated to each vehicle 1 equipped with the emergency evacuation device 10.

The server device 20 may periodically update the second blind spot inference model by periodically performing the operation shown in the flowchart of FIG. 4. As a result, the first blind spot inference model which the first blind spot information acquisition unit 13 of the emergency evacuation device 10 has is also updated periodically.

As mentioned above, the emergency evacuation device 10 according to Embodiment 1 includes the information acquisition unit 12, the first blind spot information acquisition unit 13 and the parking position determination unit 14. The information acquisition unit 12 acquires the road geometry information about the geometry of the road along which the vehicle 1 is traveling, and the traveling environment information about a traveling environment of the above-mentioned road. The first blind spot information acquisition unit 13 inputs the road geometry information and the traveling environment information which are acquired by the information acquisition unit to the first blind spot inference model, and thereby acquire, using the first blind spot inference model, the first blind spot information indicating a blind spot area of the road along which the vehicle 1 is traveling, the first blind spot inference model being configured to output first blind spot information indicating a blind spot area of a road when receiving road geometry information about the geometry of the road and traveling environment information about a traveling environment of the road. The parking position determination unit 14 determines a parking position by using the first blind spot information acquired by the first blind spot information acquisition unit 13. In this way, the emergency evacuation device 10 uses the first blind spot inference model that, when receiving road geometry information related to a static blind spot and traveling environment information related to a dynamic blind spot, outputs first blind spot information indicating a blind spot area of a road, thereby acquiring the first blind spot information indicating a blind spot area of the road along which the vehicle 1 is traveling, and then determining a parking position. Thus, a parking position can be determined while the parking position is prevented from being in a static blind spot or a dynamic blind spot.

Further, in Embodiment 1, the traveling environment information indicates an obstruction present on the road or in the vicinity of the road, the obstruction being detected using at least one of the image capturing device or the distance sensor which is mounted in the vehicle 1. Using, as an input to the first blind spot inference model, the traveling environment information indicating the obstruction which may move, the emergency evacuation device 10 can acquire the first blind spot information indicating a dynamic blind spot area from the first blind spot inference model.

Embodiment 2

Figure 5:
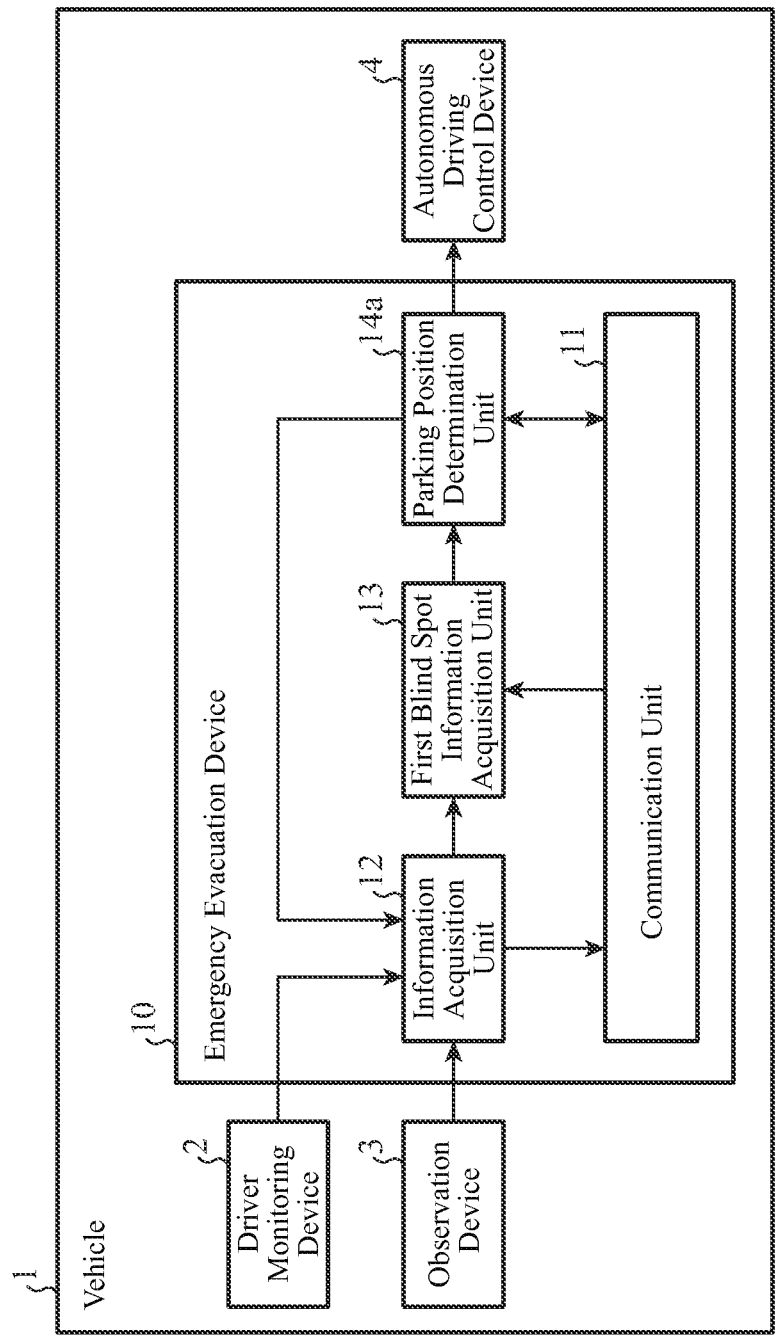
FIG. 5 is a block diagram showing an example of the configuration of an emergency evacuation device according to Embodiment 2.

FIG. 5 is a block diagram showing an example of the configuration of an emergency evacuation device 10 according to Embodiment 2. The emergency evacuation device 10 according to Embodiment 2 has a configuration in which the parking position determination unit 14 which the emergency evacuation device 10 of Embodiment 1 shown in FIG. 1 includes is replaced by a parking position determination unit 14a. In FIG. 5, components which are the same as or corresponding to those shown in FIG. 1 are denoted by the same reference signs, and an explanation of the components will be omitted hereinafter.

In the emergency evacuation device 10 of Embodiment 2, a communication unit 11 transmits both information about the road along which a vehicle 1 is traveling, and observation information generated by an observation device 3 observing the road, to a server device 20. The information about the road along which the vehicle 1 is traveling is, for example, position information about the vehicle 1. The communication unit 11 may acquire the information about the road along which the vehicle 1 is traveling from a not-illustrated car navigation device or the like.

Further, when the driver of the vehicle 1 enters a manual driving incapable state, the communication unit 11 transmits an emergency stop trigger including the information about the road along which the vehicle 1 is traveling to the server device 20. The communication unit 11 then receives second blind spot information indicating a blind spot area on the road along which the vehicle 1 is traveling from the server device 20, and outputs the second blind spot information to the parking position determination unit 14a. The parking position determination unit 14a determines a parking position by using the second blind spot information received by the communication unit 11, and checks whether or not the determined parking position is a blind spot area by using first blind spot information acquired by a first blind spot information acquisition unit 13. When it is confirmed on the basis of the first blind spot information that the parking position determined using the second blind spot information is a blind spot area, the parking position determination unit 14a changes the parking position.

Figure 6:
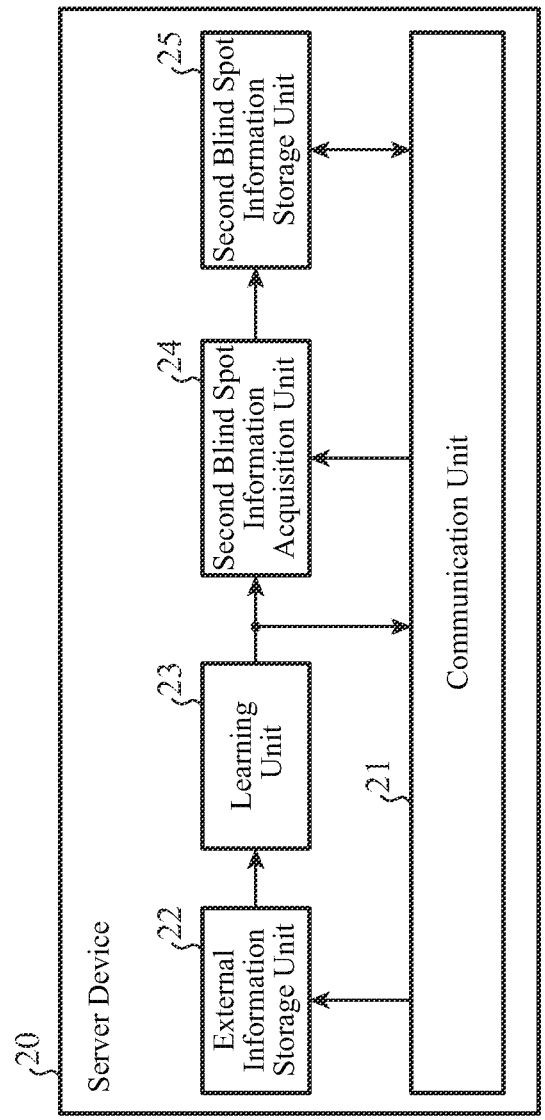
FIG. 6 is a block diagram showing an example of the configuration of a server device according to Embodiment 2.

FIG. 6 is a block diagram showing an example of the configuration of the server device 20 according to Embodiment 2. The server device 20 according to Embodiment 2 has a configuration in which a second blind spot information acquisition unit 24 and a second blind spot information storage unit 25 are added to the server device 20 of Embodiment 1 shown in FIG. 2. In FIG. 6, components which are the same as or corresponding to those shown in FIG. 2 are denoted by the same reference signs, and an explanation of the components will be omitted hereinafter.

In the server device 20 of Embodiment 2, a communication unit 21 receives both the information about the road along which a vehicle 1 equipped with the emergency evacuation device 10 is traveling, and the observation information generated by the observation device 3 observing the road, from the emergency evacuation device 10. The communication unit 21 outputs the received pieces of information to the second blind spot information acquisition unit 24. The second blind spot information acquisition unit 24 has a second blind spot inference model which a learning unit 23 has generated. The second blind spot information acquisition unit 24 inputs the observation information generated by the observation device 3, which the communication unit 21 has received, to the second blind spot inference model, and thereby acquires second blind spot information which the second blind spot inference model outputs. The second blind spot information acquisition unit 24 links the information about the road, which the communication unit 21 has received, to the second blind spot information acquired from the second blind spot inference model, and stores the linked pieces of information in the second blind spot information storage unit 25. In this way, the second blind spot information acquisition unit 24 acquires the pieces of second blind spot information about a large number of roads along which a large number of vehicles 1 have traveled from the second blind spot inference model, and stores the pieces of second blind spot information in the second blind spot information storage unit 25. These vehicles 1 correspond to "second vehicles."

The communication unit 21 receives an emergency stop trigger which the emergency evacuation device 10 mounted in a vehicle 1 has transmitted. The communication unit 21 acquires the second blind spot information to which information about a road corresponding to information about the road along which the vehicle 1 is traveling is linked, the latter information about the road being included in the emergency stop trigger, from the second blind spot information storage unit 25, and sends the second blind spot information back to the emergency evacuation device 10 of the vehicle 1.

The information inputted to the second blind spot inference model includes road geometry information and traveling environment information which are previously mentioned. The second blind spot information outputted by the second blind spot inference model indicates a blind spot area of the road along which the vehicle 1 equipped with the emergency evacuation device 10 which has transmitted the observation information generated by the observation device 3 to the server device 20 is traveling. The blind spot area indicated by the second blind spot information may include a static blind spot area which results from the geometry of the road, and a dynamic blind spot area which results from an obstruction present on the road or in the vicinity of the road, like a blind spot area indicated by the first blind spot information.

Figure 7:
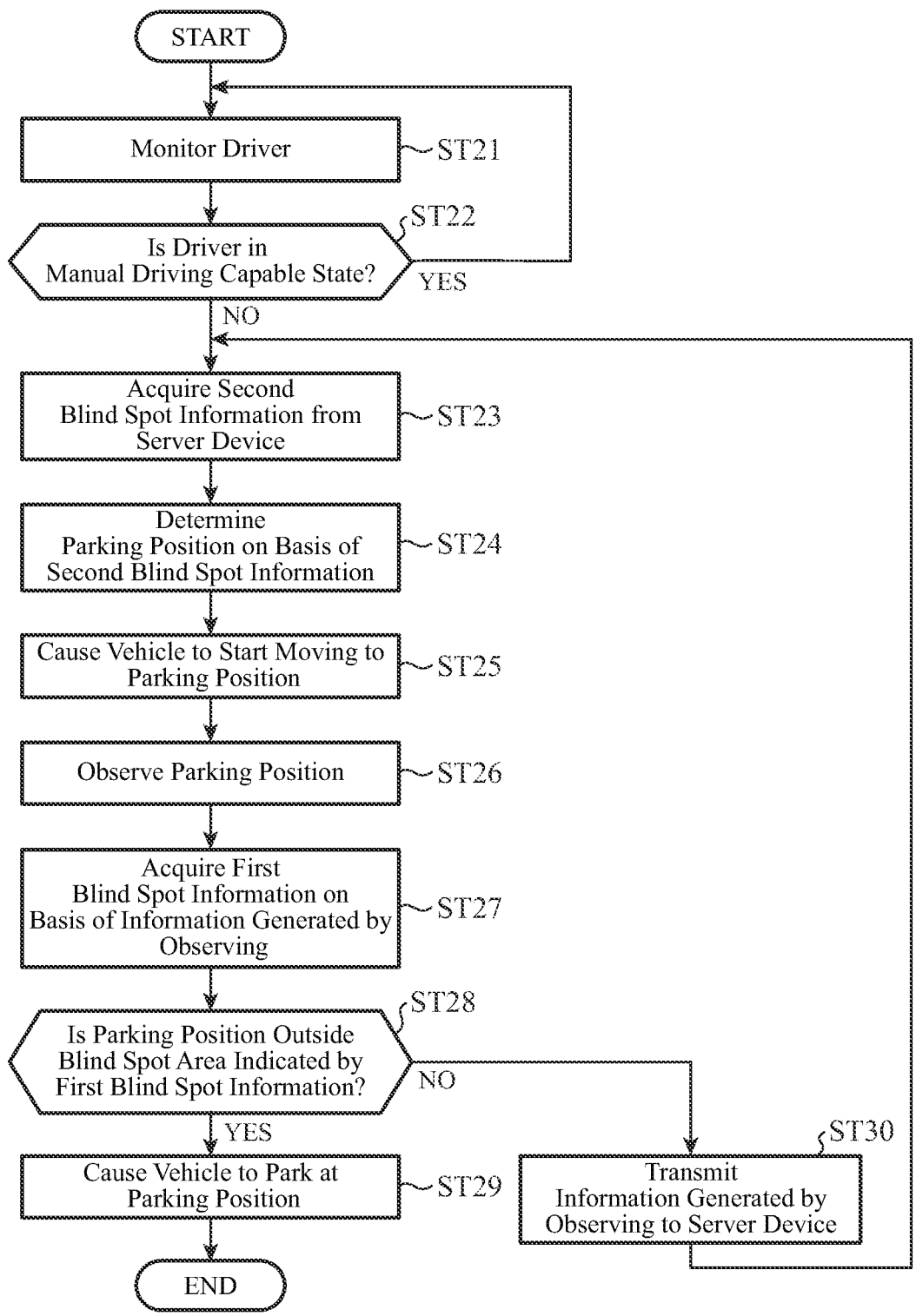
FIG. 7 is a flowchart showing an example of the operation of the emergency evacuation device according to Embodiment 2.

FIG. 7 is a flowchart showing an example of the operation of the emergency evacuation device 10 according to Embodiment 2. Processes of steps ST21 and ST22 in the flowchart of FIG. 7 are the same as those of steps ST1 and ST2 in the flowchart of FIG. 3.

In step ST23, an information acquisition unit 12 receives a notification indicating that the driver of the vehicle 1 has entered the manual driving incapable state from a driver monitoring device 2, and outputs the notification to the communication unit 11. When receiving this notification, the communication unit 11 transmits an emergency stop trigger including information about the road along which the vehicle 1 is traveling to the server device 20. The communication unit 11 then receives the second blind spot information about the road along which the vehicle 1 is traveling from the server device 20, and outputs the second blind spot information to the parking position determination unit 14a.

In step ST24, using the second blind spot information received from the server device 20, the parking position determination unit 14a determines a parking position by setting, as the parking position, a place which is not a blind spot area of the road along which the vehicle 1 is traveling. The parking position may be either within the range of observations of the observation device 3, i.e., close to the current position of the vehicle 1, or outside the range of observations of the observation device 3, i.e., apart from the current position of the vehicle 1. The parking position determination unit 14a notifies an autonomous driving control device 4 and the information acquisition unit 12 of the determined parking position.

In step ST25, the autonomous driving control device 4 causes the vehicle to start moving to the parking position which the parking position determination unit 14a has determined. In step ST26, when the parking position becomes included in the range of observations of the observation device 3, the information acquisition unit 12 acquires observation information which the observation device 3 has generated by observing the parking position.

In step ST27, the first blind spot information acquisition unit 13 inputs the information, which the information acquisition unit 12 has acquired from the observation device 3, to a first blind spot inference model, and thereby acquires the first blind spot information indicating a blind spot area of the road along which the vehicle 1 is traveling from the first blind spot inference model, like in the case of step ST4 in the flowchart of FIG. 3.

In step ST28, the parking position determination unit 14a checks whether or not the parking position determined using the second blind spot information received from the server device 20 is outside the blind spot area indicated by the first blind spot information which the first blind spot information acquisition unit 13 has acquired from the first blind spot inference model. The time that the server device 20 acquires the second blind spot information is earlier than the time that the first blind spot information acquisition unit 13 acquires the first blind spot information. Therefore, there is a possibility that an obstruction moves and this results in a change of a dynamic blind spot area within a time interval from the time that the second blind spot information is acquired to the time that the first blind spot information is acquired. Therefore, the parking position determination unit 14a checks whether or not the blind spot area indicated by the second blind spot information still remains, and whether or not a new blind spot area other than the blind spot area indicated by the second blind spot information has occurred.

When the parking position is outside the blind spot area (when "YES" in step ST28), the autonomous driving control device 4, in step ST29, causes the vehicle 1 to stop at the parking position. In contrast, when the parking position is within the blind spot area (when "NO" in step ST28), the parking position determination unit 14a instructs the autonomous driving control device 4 to stop the evacuation to the parking position and to perform autonomous travelling along the road.

Further, when the parking position is within the blind spot area (when "NO" in step ST28), it is necessary to update the second blind spot information received from the server device 20 because the second blind spot information is out of date and wrong. To this end, in step ST30, the parking position determination unit 14a instructs the communication unit 11 to transmit the observation information which the observation device 3 has generated in step ST26 to the server device 20. The communication unit 11 transmits information about the road along which the vehicle 1 is traveling and the observation information which the observation device 3 has generated to the server device 20 in accordance with the instruction.

Further, when the parking position is within the blind spot area (when "NO" in step ST28), it is necessary to change the parking position of the vehicle 1 to a position outside the blind spot area. To this end, the parking position determination unit 14a instructs the information acquisition unit 12 to acquire the second blind spot information corresponding to the newest position information about the vehicle 1 from the server device 20. The information acquisition unit 12 performs the processes of step ST23 and subsequent steps in accordance with the instruction.

Figure 8:
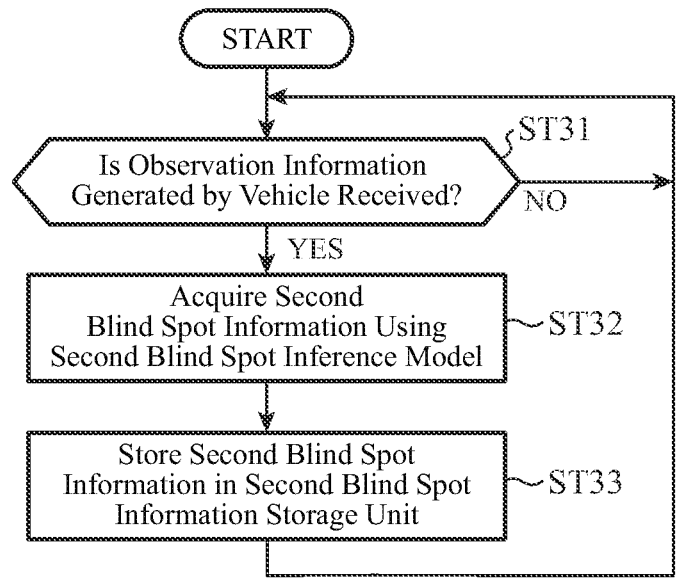
FIG. 8 is a flowchart showing an operation of storing second blind spot information which is performed by the server device according to Embodiment 2.

FIG. 8 is a flowchart showing an operation of storing second blind spot information which is performed by the server device 20 according to Embodiment 2. Each of the emergency evacuation devices 10 mounted in a large number of vehicles 1 performs an operation of transmitting information about the road along which the corresponding vehicle 1 is traveling, and observation information generated by the corresponding observation device 3 observing the road, to the server device 20.

In step ST31, the communication unit 21 receives the information about the road along which the vehicle 1 (corresponding to a second vehicle) equipped with the emergency evacuation device 10 is traveling, and the observation information generated by the observation device 3 observing the road. When receiving these pieces of information (when "YES" in step ST31), the communication unit 21 outputs the received pieces of information to the second blind spot information acquisition unit 24. In contrast, when not receiving the pieces of information (when "NO" in step ST31), the communication unit 21 repeats the receiving operation.

In step ST32, the second blind spot information acquisition unit 24 inputs the observation information generated by the observation device 3, which the communication unit 21 has received, to the second blind spot inference model, and thereby acquires the second blind spot information which the second blind spot inference model outputs. In step ST33, the second blind spot information acquisition unit 24 links the information about the road, which the communication unit 21 has received, to the second blind spot information acquired from the second blind spot inference model, and stores the linked pieces of information in the second blind spot information storage unit 25.

Figure 9:
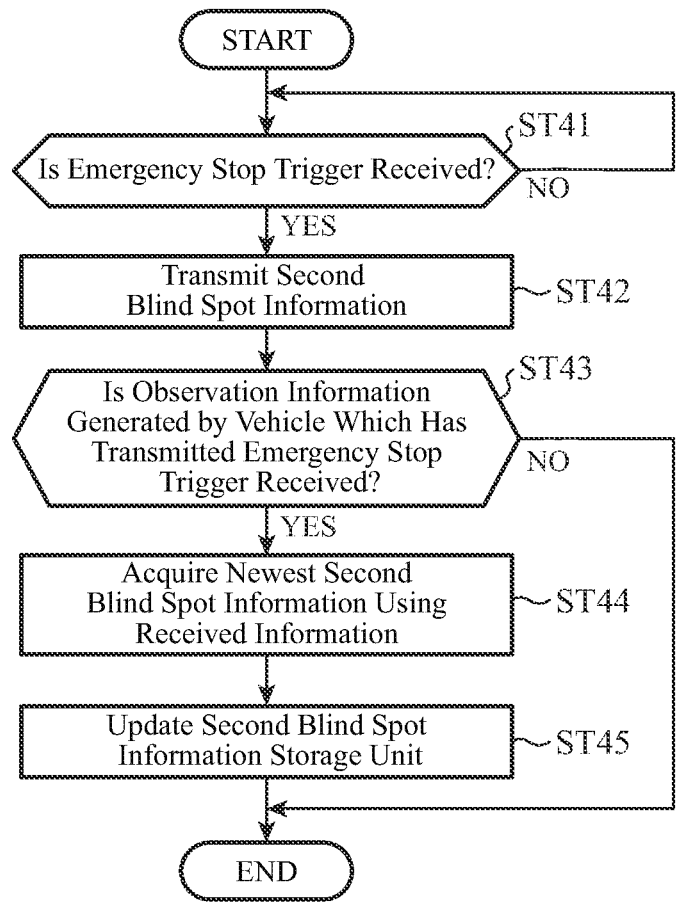
FIG. 9 is a flowchart showing an operation of transmitting the second blind spot information which is performed by the server device according to Embodiment 2.

FIG. 9 is a flowchart showing an operation of transmitting second blind spot information which is performed by the server device 20 according to Embodiment 2. The server device 20 performs the operation shown in the flowchart of FIG. 8 and the operation shown in the flowchart of FIG. 9 in parallel.

When receiving, in step ST41, an emergency stop trigger which the emergency evacuation device 10 mounted in a vehicle 1 has transmitted (when "YES" in step ST41), the communication unit 21, in step ST42, acquires the second blind spot information to which information about a road corresponding to information about the road along which the vehicle 1 is traveling is linked, the latter information about the road being included in the emergency stop trigger, from the second blind spot information storage unit 25. The communication unit 21 sends the second blind spot information acquired from the second blind spot information storage unit 25 back to the emergency evacuation device 10 which has transmitted the emergency stop trigger. In contrast, when not receiving any emergency stop trigger (when "NO" in step ST41), the communication unit 21 repeats the receiving operation.

The emergency stop trigger which the communication unit 21 receives in step ST41 is the one which the emergency evacuation device 10 transmits in step ST23 of FIG. 7. Further, the second blind spot information which the communication unit 21 transmits in step ST42 is the one which the emergency evacuation device 10 receives in step ST23 of FIG. 7.

In step ST43, when receiving observation information generated by the observation device 3 of the vehicle 1 which has transmitted the emergency stop trigger, and information about the road along which the vehicle 1 is traveling, from the emergency evacuation device 10 mounted in the vehicle 1 (when "YES" in step ST43), the communication unit 21 outputs the received pieces of information to the second blind spot information acquisition unit 24. In contrast, when not receiving the observation information generated by the observation device 3 within a predetermined time period (when "NO" in step ST43), the communication unit 21 ends the operation shown in the flowchart of FIG. 9.

In step ST44, the second blind spot information acquisition unit 24 inputs the observation information generated by the observation device 3, which the communication unit 21 has received, to the second blind spot inference model, and thereby acquires the second blind spot information which the second blind spot inference model outputs. In step ST45, the second blind spot information acquisition unit 24 links the information about the road, which the communication unit 21 has received, to the second blind spot information acquired from the second blind spot inference model, and stores the linked pieces of information in the second blind spot information storage unit 25. In this way, the server device 20 acquires the newest second blind spot information (step ST44) and then updates the old second blind spot information already stored in the second blind spot information storage unit 25 to the newest second blind spot information (step ST45) because the second blind spot information transmitted, in step ST42, to the emergency evacuation device 10 is out of date and wrong.

Both the information about the road and the observation information generated by the observation device 3 which the communication unit 21 receives in step ST43 are the pieces of information which the emergency evacuation device 10 transmits in step ST30 of FIG. 7.

As mentioned above, when the driver of the vehicle 1 enters the manual driving incapable state, the communication unit 11 of Embodiment 2 transmits the information about the road along which the vehicle 1 is traveling to the server device 20. The communication unit 11 then receives the second blind spot information transmitted from the server device 20 which has received the information about the road along which the vehicle 1 is traveling, the second blind spot information indicating a blind spot area of the road along which the vehicle 1 is traveling. The parking position determination unit 14a determines a parking position by using the second blind spot information received by the communication unit 11, and checks whether or not the determined parking position is a blind spot area by using the first blind spot information acquired by the first blind spot information acquisition unit 13. As a result, the parking position determination unit 14a can determine a parking position by using the second blind spot information including a blind spot area present outside the range of observations of the observation device 3 mounted in the vehicle 1. For example, when the driver enters a driving incapable state while the vehicle 1 is approaching an intersection, a railroad line or the like, the emergency evacuation device 10 needs to cause the vehicle 1 to make an emergency stop after the vehicle passes through the intersection, the railroad line or the like because the vehicle 1 is not allowed to make an emergency stop in any intersection, any railroad line or the like. At that time, even though the observation device 3 cannot observe the other side of the intersection, the railroad line or the like, the parking position determination unit 14a can set, as the parking position, a position outside the blind spot area in the other side of the intersection, the railroad line or the like by using the second blind spot information including the blind spot area in the other side of the intersection, the railroad line or the like. Further, by checking whether the parking position determined using the second blind spot information is still outside any blind spot area, the parking position determination unit 14a can prevent, when a dynamic blind spot area occurs at the parking position, the vehicle 1 from making an emergency stop in this dynamic blind spot area.

Further, in Embodiment 2, the second blind spot information is information which the server device 20 has acquired using the second blind spot inference model by inputting, to the second blind spot inference model, road geometry information and traveling environment information which are transmitted from a second vehicle which has traveled along the road along which the vehicle 1 is traveling, the second blind spot inference model being configured to output second blind spot information indicating a blind spot area of a road when receiving road geometry information about the geometry of the road and traveling environment information about a traveling environment of the road. Because the second blind spot information may include a blind spot area present outside the range of observations of the observation device 3 mounted in the vehicle 1, the emergency evacuation device 10 can determine a parking position from a range wider than the range of observations of the observation device 3.

Further, when it is confirmed that the parking position which the parking position determination unit 14a has determined using the second blind spot information is in a blind spot area on the basis of the first blind spot information, the communication unit 11 of Embodiment 2 transmits the road geometry information and the traveling environment information which are acquired by the information acquisition unit 12 to the server device 20. As a result, when the second blind spot information received from the server device 20 is out of date and wrong, the emergency evacuation device 10 can transmit the newest road geometry information and the newest traveling environment information which are needed in order for the server device 20 to update the second blind spot information to the server device 20.

The parking position determination unit 14 or 14a of the emergency evacuation device 10 may set a parking avoidance area which is created by providing an extra area for the blind spot area indicated by the first blind spot information, and set, as a parking position, a place which is not the parking avoidance area of the road along which the vehicle 1 is traveling. For example, the parking avoidance area is a larger area than the blind spot area and is set in such a way that the vehicle 1 does not pass through the blind spot area while the vehicle 1 is being evacuated to and stopped at the parking position. Further, in times of low visibility, such as during nighttime and in rainy weather, the parking position determination unit 14 or 14a may increase the size of the parking avoidance area as compared with times of high visibility, such as during daytime and in fine weather.

Further, the second blind spot information acquisition unit 24 of the server device 20 may set a parking avoidance area which is created by providing an extra area for the blind spot area indicated by the second blind spot information, and store the parking avoidance area as the second blind spot information in the second blind spot information storage unit 25.

Finally, the hardware configurations of the emergency evacuation device 10 and the server device 20 according to each of the embodiments will be explained.

Figure 10:
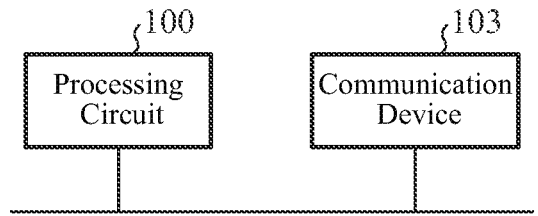
FIG. 10 is a diagram showing an example of the hardware configuration of the emergency evacuation device according to each of the embodiments.
Figure 11:
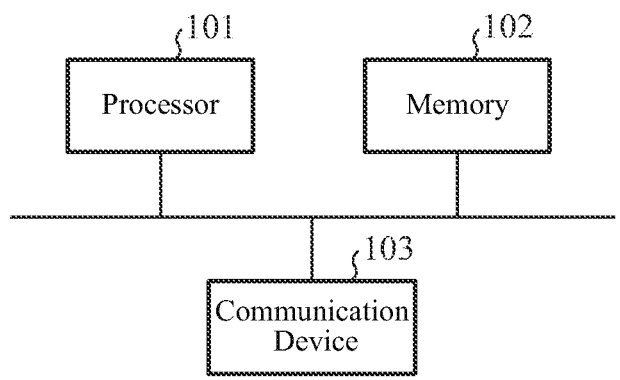
FIG. 11 is a diagram showing another example of the hardware configuration of the emergency evacuation device according to each of the embodiments.

FIGS. 10 and 11 are diagrams showing examples of the hardware configuration of the emergency evacuation device 10 according to each of the embodiments. The communication unit 11 in the emergency evacuation device 10 is a communication device 103. The functions of the information acquisition unit 12, the first blind spot information acquisition unit 13 and the parking position determination unit 14 or 14a, which are included in the emergency evacuation device 10, are implemented by a processing circuit. More specifically, the emergency evacuation device 10 includes a processing circuit for implementing the above-mentioned functions. The processing circuit may be either a processing circuit 100 as hardware for exclusive use or a processor 101 that executes a program stored in a memory 102.

In the case where the processing circuit is hardware for exclusive use, as shown in FIG. 10, the processing circuit 100 is, for example, a single circuit, a composite circuit, a programmable processor, a parallel programmable processor, an application specific integrated circuit (ASIC), a field programmable gate array (FPGA), or a combination thereof. The functions of the information acquisition unit 12, the first blind spot information acquisition unit 13 and the parking position determination unit 14 or 14a may be implemented by multiple processing circuits 100, or may be implemented collectively by a single processing circuit 100. Further, the function of the communication device 103 may be implemented by the processing circuit 100.

In the case where the processing circuit is the processor 101, as shown in FIG. 11, the functions of the information acquisition unit 12, the first blind spot information acquisition unit 13 and the parking position determination unit 14 or 14a are implemented by software, firmware or a combination of software and firmware. The software or the firmware is described as a program and the program is stored in the memory 102. The processor 101 implements the function of each of the units by reading and executing the program stored in the memory 102. More specifically, the emergency evacuation device 10 includes the memory 102 for storing a program which, when executed by the processor 101, causes the steps shown in the flowchart of FIG. 3 or the like to be performed. Further, it can also be said that the program causes a computer to perform procedures or methods performed by the information acquisition unit 12, the first blind spot information acquisition unit 13 and the parking position determination unit 14 or 14a.

A part of the functions of the information acquisition unit 12, the first blind spot information acquisition unit 13 and the parking position determination unit 14 or 14a may be implemented by hardware for exclusive use, and another part of the functions may be implemented by software or firmware. As mentioned above, the processing circuit in the emergency evacuation device 10 can implement the above-mentioned functions by using hardware, software, firmware or a combination thereof.

Figure 12:
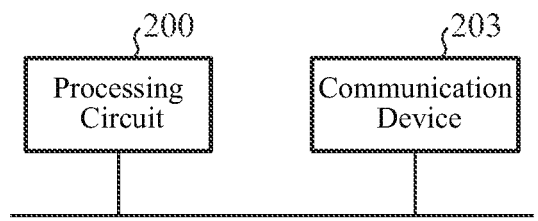
FIG. 12 is a diagram showing an example of the hardware configuration of the server device according to each of the embodiments.
Figure 13:
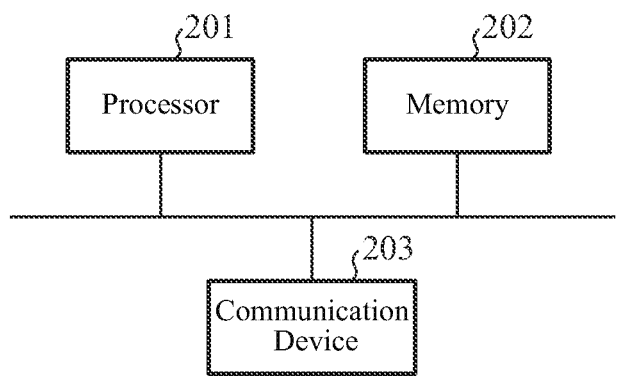
FIG. 13 is a diagram showing another example of the hardware configuration of the server device according to each of the embodiments.

FIGS. 12 and 13 are diagrams showing examples of the hardware configuration of the server device 20 according to each of the embodiments. The communication unit 21 in the server device 20 is a communication device 203. The functions of the external information storage unit 22, the learning unit 23, the second blind spot information acquisition unit 24 and the second blind spot information storage unit 25, which are included in the server device 20, are implemented by a processing circuit. More specifically, the server device 20 includes a processing circuit for implementing the above-mentioned functions. The processing circuit may be either a processing circuit 200 as hardware for exclusive use or a processor 201 that executes a program stored in a memory 202.

In the case where the processing circuit is hardware for exclusive use, as shown in FIG. 12, the processing circuit 200 is, for example, a single circuit, a composite circuit, a programmable processor, a parallel programmable processor, an ASIC, an FPGA or a combination thereof. The functions of the external information storage unit 22, the learning unit 23, the second blind spot information acquisition unit 24 and the second blind spot information storage unit 25 may be implemented by multiple processing circuits 200, or may be implemented collectively by a single processing circuit 200. Further, the function of the communication device 203 may be implemented by the processing circuit 200.

In the case where the processing circuit is the processor 201, as shown in FIG. 13, the functions of the learning unit 23 and the second blind spot information acquisition unit 24 are implemented by software, firmware or a combination of software and firmware. The software or the firmware is described as a program and the program is stored in the memory 202. The processor 201 implements the function of each of the units by reading and executing the program stored in the memory 202. More specifically, the server device 20 includes the memory 202 for storing a program which, when executed by the processor 201, causes the steps shown in the flowchart of FIG. 4 or the like to be performed. Further, it can also be said that the program causes a computer to perform procedures or methods performed by the learning unit 23 and the second blind spot information acquisition unit 24.

The functions of the external information storage unit 22 and the second blind spot information storage unit 25 are implemented by the memory 202.

A part of the functions of the learning unit 23 and the second blind spot information acquisition unit 24 may be implemented by hardware for exclusive use, and another part of the functions may be implemented by software or firmware. As mentioned above, the processing circuit in the server device 20 can implement the above-mentioned functions by using hardware, software, firmware or a combination thereof.

In FIGS. 11 and 12, each of the processors 101 and 201 is a central processing unit (CPU), a processing device, an arithmetic device, a microprocessor, or the like.

Each of the memories 102 and 202 may be a non-volatile or volatile semiconductor memory such as a random access memory (RAM), a read only memory (ROM), an erasable programmable ROM (EPROM) or a flash memory, a magnetic disc such as a hard disc or a flexible disc, or an optical disc such as a compact disc (CD) or a digital versatile disc (DVD).

Although in Embodiments 1 and 2 the time that the driver of the vehicle 1 enters the manual driving incapable state is mentioned as an example of the time that the parking position determination unit 14 or 14a determines a parking position, no limitation thereto is intended. For example, when an emergency vehicle is approaching the vehicle 1, the parking position determination unit 14 or 14a determines a parking position, and the autonomous driving control device 4 causes the vehicle 1 to evacuate to the parking position in such a way as not to block the traveling of the emergency vehicle.

Further, although in Embodiments 1 and 2 the configuration in which the functions of the emergency evacuation device 10 are mounted in the vehicle 1 is shown, a configuration in which the functions of the emergency evacuation device 10 are mounted in the server device 20 may be provided. Hereinafter, two examples (FIGS. 14 and 15) of the configuration in which the functions of the emergency evacuation device 10 are mounted in the server device 20 will be explained.

Figure 14:
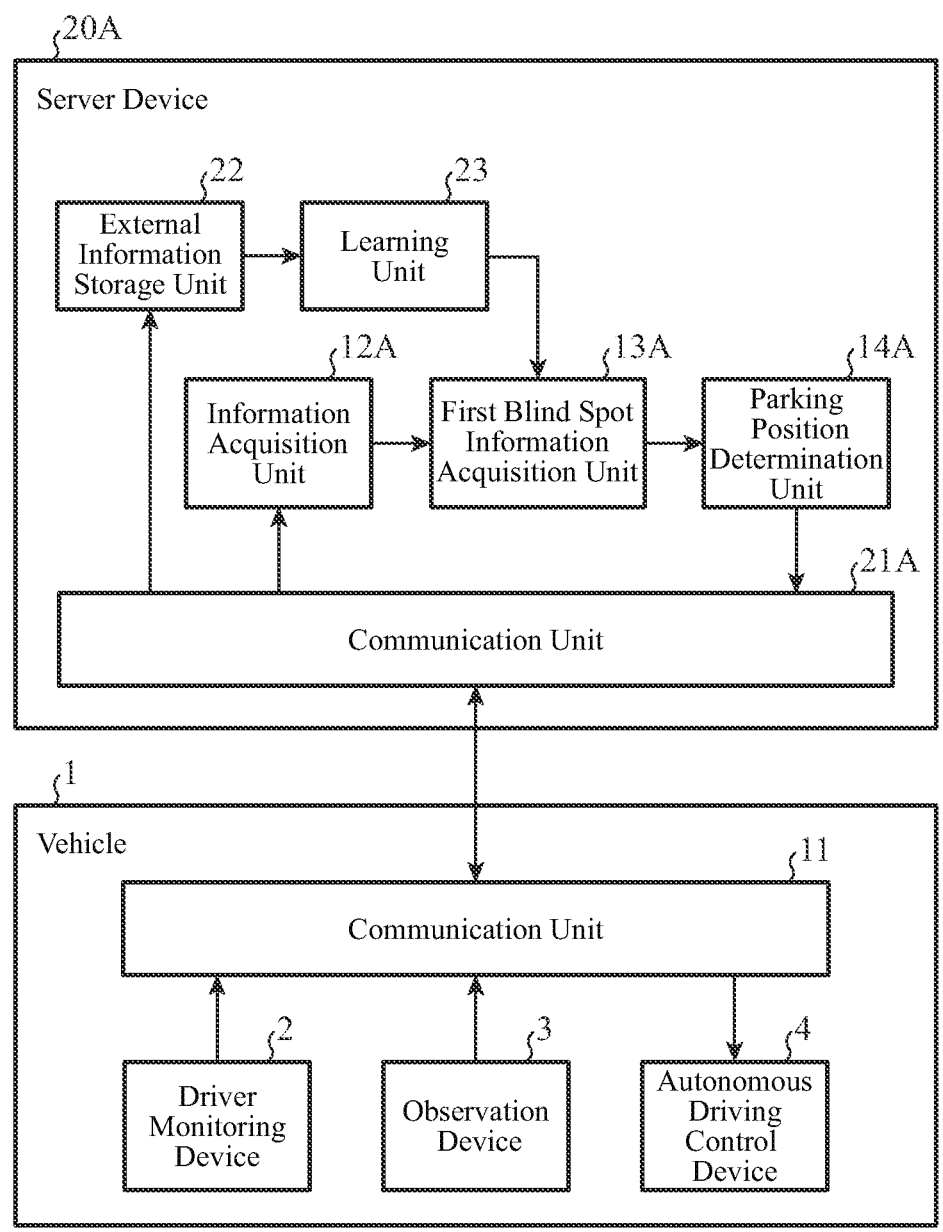
FIG. 14 is a block diagram showing an example of a configuration in which the functions of the emergency evacuation device according to Embodiment 1 are mounted in a server device.

FIG. 14 is a block diagram showing an example of the configuration in which the functions of the emergency evacuation device 10 according to Embodiment 1 are mounted in a server device 20A. The server device 20A includes an information acquisition unit 12A, a first blind spot information acquisition unit 13A, a parking position determination unit 14A, a communication unit 21A, an external information storage unit 22 and a learning unit 23. In FIG. 14, components which are the same as or corresponding to those shown in FIGS. 1 and 2 are denoted by the same reference signs, and an explanation of the components will be omitted hereinafter.

The information acquisition unit 12A acquires, via a communication unit 11 of a vehicle 1 and the communication unit 21A of the server device 20A, an emergency stop trigger which the vehicle 1 has transmitted and observation information which an observation device 3 of the vehicle 1 has generated. The information acquisition unit 12A then outputs the information acquired from the observation device 3 to the first blind spot information acquisition unit 13A. The first blind spot information acquisition unit 13A has a first blind spot inference model. The first blind spot inference model is generated by the external information storage unit 22 and the learning unit 23, like that of Embodiment 1. The first blind spot information acquisition unit 13A inputs the observation information which the observation device 3 has generated to the first blind spot inference model, and thereby acquires first blind spot information which the first blind spot inference model outputs. The parking position determination unit 14A determines a parking position of the vehicle 1 by using the first blind spot information acquired by the first blind spot information acquisition unit 13A. The communication unit 21A notifies, via the communication unit 11 of the vehicle 1, an autonomous driving control device 4 of the parking position which the parking position determination unit 14A has determined. The autonomous driving control device 4 of the vehicle 1 causes the vehicle 1 to evacuate to the parking position and to stop by controlling various actuators of the vehicle 1.

As mentioned above, the server device 20A uses the first blind spot inference model that, when receiving road geometry information related to a static blind spot and traveling environment information related to a dynamic blind spot, outputs first blind spot information indicating a blind spot area of a road, thereby acquiring first blind spot information indicating a blind spot area of the road along which the vehicle 1 is traveling, and then determining a parking position. Thus, a parking position can be determined while the parking position is prevented from being in a static blind spot or a dynamic blind spot.

Figure 15:
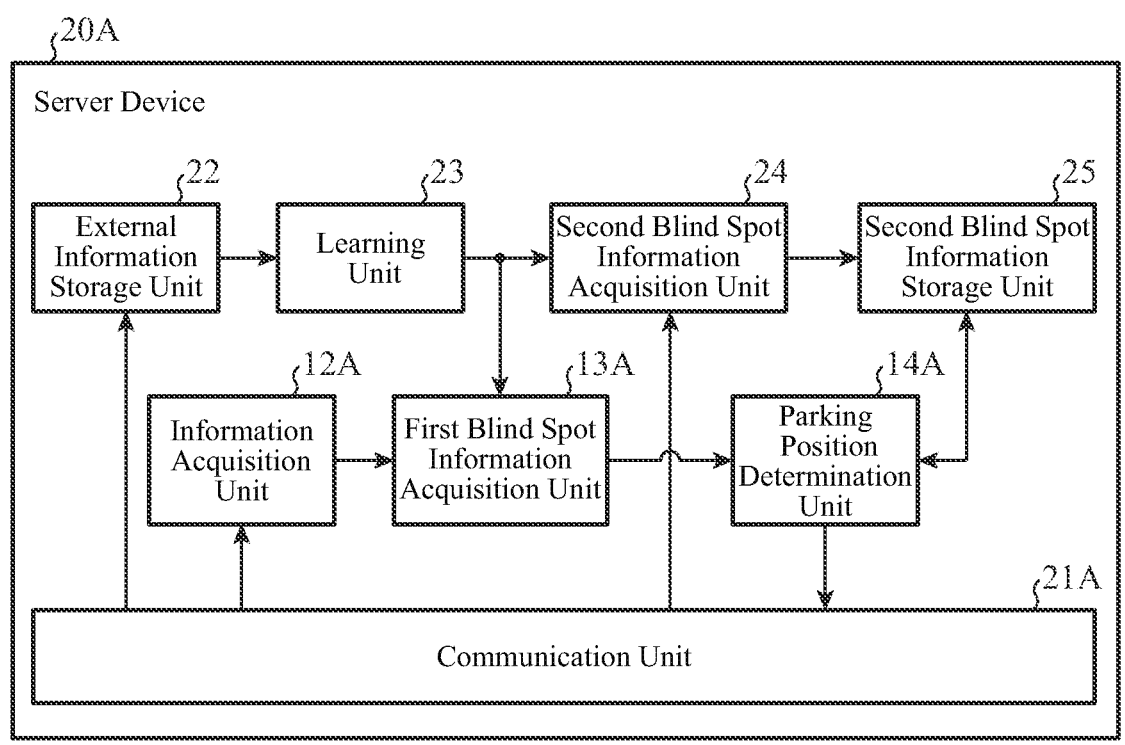
FIG. 15 is a block diagram showing an example of a configuration in which the functions of the emergency evacuation device according to Embodiment 2 are mounted in a server device.

FIG. 15 is a block diagram showing an example of the configuration in which the functions of the emergency evacuation device 10 according to Embodiment 2 are mounted in a server device 20A. The server device 20A includes an information acquisition unit 12A, a first blind spot information acquisition unit 13A, a parking position determination unit 14A, a communication unit 21A, an external information storage unit 22, a learning unit 23, a second blind spot information acquisition unit 24 and a second blind spot information storage unit 25. In FIG. 15, components which are the same as or corresponding to those shown in FIGS. 6 and 14 are denoted by the same reference signs, and an explanation of the components will be omitted hereinafter. Further, because a vehicle 1 has a configuration shown in FIG. 14, FIG. 14 will be referred to.

The communication unit 21A receives information about the road along which the vehicle 1 (which corresponds to a second vehicle) is traveling (e.g., position information about the vehicle 1) and observation information generated by an observation device 3 of the vehicle 1 observing the road, from the vehicle 1. The second blind spot information acquisition unit 24 has a second blind spot inference model. The second blind spot inference model is generated by the external information storage unit 22 and the learning unit 23, like that of Embodiment 2. The second blind spot information acquisition unit 24 inputs the observation information generated by the observation device 3, which the communication unit 21A has received, to the second blind spot inference model, and thereby acquires second blind spot information which the second blind spot inference model outputs. The second blind spot information acquisition unit 24 links the information about the road, which the communication unit 21A has received, to the second blind spot information acquired from the second blind spot inference model, and stores the linked pieces of information in the second blind spot information storage unit 25. In this way, the second blind spot information acquisition unit 24 acquires pieces of second blind spot information about a large number of roads along which a large number of vehicles 1 have traveled from the second blind spot inference model, and stores the pieces of second blind spot information in the second blind spot information storage unit 25.

The information acquisition unit 12A acquires, via a communication unit 11 of a vehicle 1 and the communication unit 21A of the server device 20A, an emergency stop trigger which the vehicle 1 has transmitted and observation information which an observation device 3 of the vehicle 1 has generated. When the information acquisition unit 12A acquires the emergency stop trigger, the first blind spot information acquisition unit 13A inputs the observation information generated by the observation device 3 to a first blind spot inference model, thereby acquires first blind spot information which the first blind spot inference model outputs, and outputs the first blind spot information to the parking position determination unit 14A. The parking position determination unit 14A acquires, from the second blind spot information storage unit 25, the second blind spot information to which information about a road corresponding to information about the road along the vehicle 1 is traveling (e.g., the position information about the vehicle 1) is linked, the latter information about the road being included in the emergency stop trigger which the communication unit 21A has received. The parking position determination unit 14A determines a parking position by using the second blind spot information acquired from the second blind spot information storage unit 25, and checks whether or not the determined parking position is a blind spot area, by using the first blind spot information acquired by the first blind spot information acquisition unit 13A. When it is confirmed on the basis of the first blind spot information that the parking position determined using the second blind spot information is a blind spot area, the parking position determination unit 14A changes the parking position. The communication unit 21A notifies, via the communication unit 11 of the vehicle 1, an autonomous driving control device 4 of the final parking position which the parking position determination unit 14A has determined.

As mentioned above, the server device 20A can determine a parking position by using the second blind spot information including a blind spot area present outside the range of observations of an observation device 3 mounted in a vehicle 1 which has transmitted an emergency stop trigger. Further, by checking whether the parking position determined using the second blind spot information is still outside any blind spot area, the server device 20A can prevent, when a dynamic blind spot area occurs at the parking position, the vehicle 1 from making an emergency stop in this dynamic blind spot area.

It is to be understood that a combination of the embodiments can be made, various changes can be made in any component according to any one of the embodiments, or any component according to any one of the embodiments can be omitted within the scope of the present disclosure.

INDUSTRIAL APPLICABILITY

Because the emergency evacuation device according to the present disclosure causes a vehicle to stop at a position which is determined so as to prevent the position from being included in a static blind spot area or a dynamic blind spot area, the emergency evacuation device is suitable for use as an emergency evacuation device or the like that causes a vehicle including an autonomous driving function to urgently evacuate.

REFERENCE SIGNS LIST

1 vehicle, 2 driver monitoring device, 3 observation device, 4 autonomous driving control device, 10 emergency evacuation device, 11 communication unit, 12, 12A information acquisition unit, 13, 13A first blind spot information acquisition unit, 14, 14a, 14A parking position determination unit, 20, 20A server device, 21, 21A communication unit, 22 external information storage unit, 23 learning unit, 24 second blind spot information acquisition unit, 25 second blind spot information storage unit, 100, 200 processing circuit, 101, 201 processor, 102, 202 memory, and 103, 203 communication device.

The invention claimed is:

1. An emergency evacuation device mounted in a first vehicle, for determining a parking position to which the first vehicle in a traveling state is to be caused to evacuate, the emergency evacuation device comprising:
   processing circuitry
   to acquire road geometry information about geometry of a road along which the first vehicle is traveling, and traveling environment information about a traveling environment of the road;
   to input the road geometry information and the traveling environment information which are acquired to a first blind spot inference model, and thereby acquire, using the first blind spot inference model, first blind spot information indicating a blind spot area of the road along which the first vehicle is traveling, the first blind spot inference model being configured to output first blind spot information indicating a blind spot area of a road when receiving road geometry information about geometry of the road and traveling environment information about a traveling environment of the road; and
   to determine the parking position by using the first blind spot information acquired.

2. A server device that determines a parking position to which a first vehicle in a traveling state is to be caused to evacuate, the server device comprising:
   processing circuitry
   to acquire road geometry information about geometry of a road along which the first vehicle is traveling, and traveling environment information about a traveling environment of the road;
   to input the road geometry information and the traveling environment information which are acquired to a first blind spot inference model, and thereby acquire, using the first blind spot inference model, first blind spot information indicating a blind spot area of the road along which the first vehicle is traveling, the first blind spot inference model being configured to output first blind spot information indicating a blind spot area of a road when receiving road geometry information about geometry of the road and traveling environment information about a traveling environment of the road;
   to determine the parking position by using the first blind spot information acquired; and
   to notify the first vehicle of the parking position determined.

3. The emergency evacuation device according to claim 1, wherein the processing circuitry transmits information about the road along which the first vehicle is traveling to a server device, and receives second blind spot information transmitted from the server device which has received the information about the road along which the first vehicle is traveling, the second blind spot information indicating a blind spot area of the road along which the first vehicle is traveling, and the processing circuitry determines the parking position by using the second blind spot information received, and checks whether or not the determined parking position is a blind spot area by using the first blind spot information acquired.

4. The server device according to claim 2, further comprising:

a memory in which at least one piece of information about a road and at least one piece of second blind spot information indicating a blind spot area of the road are stored while linked to each other, wherein the processing circuitry acquires the second blind spot information corresponding to information about the road along which the first vehicle is traveling from the memory, determines the parking position by using the acquired second blind spot information, and checks whether or not the determined parking position is a blind spot area by using the first blind spot information acquired.

5. The emergency evacuation device according to claim 1, wherein the traveling environment information indicates an obstruction present on the road or in a vicinity of the road, the obstruction being detected using at least one of an image capturing device or a distance sensor which is mounted in the first vehicle.

6. The server device according to claim 2, wherein the traveling environment information indicates an obstruction present on the road or in a vicinity of the road, the obstruction being detected using at least one of an image capturing device or a distance sensor which is mounted in the first vehicle.

7. The emergency evacuation device according to claim 3, wherein the second blind spot information is information which the server device has acquired using a second blind spot inference model by inputting, to the second blind spot inference model, road geometry information and traveling environment information which are transmitted from a second vehicle which has traveled along the road along which the first vehicle is traveling, the second blind spot inference model being configured to output second blind spot information indicating a blind spot area of a road when receiving road geometry information about geometry of the road and traveling environment information about a traveling environment of the road.

8. The server device according to claim 4, wherein the processing circuitry inputs road geometry information and traveling environment information which are transmitted from a second vehicle to a second blind spot inference model, thereby acquires, using the second blind spot inference model, second blind spot information indicating a blind spot area of a road along which the second vehicle is traveling, and stores the acquired second blind spot information in the memory, the second blind spot inference model being configured to output second blind spot information indicating a blind spot area of a road when receiving road geometry information about geometry of the road and traveling environment information about a traveling environment of the road.

9. The emergency evacuation device according to claim 1, wherein the processing circuitry determines the parking position when a driver of the first vehicle having an autonomous driving function enters a state in which the driver cannot perform manual driving.

10. The server device according to claim 2, wherein the processing circuitry determines the parking position when a driver of the first vehicle having an autonomous driving function enters a state in which the driver cannot perform manual driving.

11. An emergency evacuation method of determining a parking position to which a first vehicle in a traveling state is to be caused to evacuate, the emergency evacuation method comprising:

acquiring road geometry information about geometry of a road along which the first vehicle is traveling, and traveling environment information about a traveling environment of the road;

inputting the road geometry information and the traveling environment information which are acquired to a first blind spot inference model, and thereby acquiring, using the first blind spot inference model, first blind spot information indicating a blind spot area of the road along which the first vehicle is traveling, the first blind spot inference model being configured to output first blind spot information indicating a blind spot area of a road when receiving road geometry information about geometry of the road and traveling environment information about a traveling environment of the road; and determining the parking position by using the first blind spot information acquired.

* * * * *